No. 874,683. PATENTED DEC. 24, 1907.
H. W. E. JOSLING.
NON-REFILLABLE BOTTLE.
APPLICATION FILED DEC. 28, 1906.
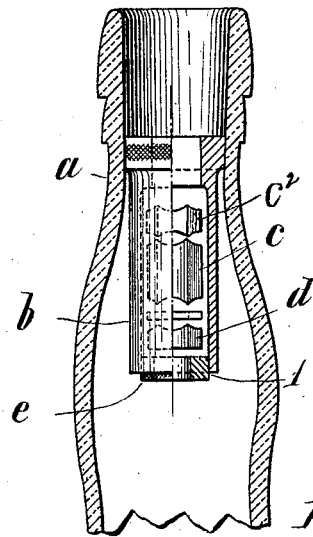
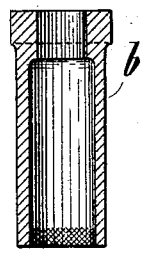
Witnesses.
Inventor.
Harold W. E. Josling.
By
James L. Norris.
Atty.
THE NORRIS PETERS CO., WASHINGTON, D. C.

UNITED STATES PATENT OFFICE.

HAROLD WILLIAM EDWIN JOSLING, OF LONDON, ENGLAND.

NON-REFILLABLE BOTTLE.

No. 874,683.          Specification of Letters Patent.          Patented Dec. 24, 1907.

Application filed December 28, 1906. Serial No. 349,884.

*To all whom it may concern:*

Be it known that I, HAROLD WILLIAM EDWIN JOSLING, a subject of the King of Great Britain, residing at 28 Budge Row, in the city of London, England, merchant, have invented certain new and useful Improvements in Non-Refillable Bottles, of which the following is a specification.

The inventions in connection with means for the prevention of fraudulent refilling of bottles and other vessels for the reception of liquids are, I am aware, extremely numerous and varied in construction, but as far as I am aware, the great majority fail to meet commercial requirements owing mainly to the difficulties which present themselves as soon as manufacture on a practical scale is attempted, and especially is this the case when dealing with devices for the purpose composed wholly of glass or like material sufficiently cheap in first cost and from its very nature incapable of injuriously affecting the flavor, taste, or lasting qualities of the liquid to be protected by its means.

To meet commercial requirements, the cost of material, manufacture and application in their effective positions in the bottles or vessels of the parts of the non-refilling or prevention of fraudulent substitution device must not add materially to the price to be paid by the consumer on the one hand, or by the producer on the other hand, and further the materials must be neutral in character as regards the protected liquid and, above all, the construction must be simple and efficient to defeat the ingenious devices of the persons who practice such deceits as have to be provided against.

The present invention is characterized by the fewness of its parts and their simple construction and application.

The essential features of this invention are constituted by dispensing with artificial means such as weights, resilience, use of cork or other light or specially heavy substances and by adopting sliding parts of glass, porcelain, earthenware or other rigid, inert material appropriate for the purpose, actuated and controlled by the action of gravity and the force necessarily exerted through the liquid in its egress or an attempt being made to force in liquid coupled with the effect in the different operations of the air affected the whole apparatus being of great compactibility and my invention consists of a tubular casing or liner fitted or formed wholly or in part in the neck of a bottle and fixed, cemented or securely joined wholly or in part, thereto with a valve seat at the lower end of the tube with an entrance or entrances to the bottle; on this valve seat a valve block or valve piece solid or hollow but so shaped above and below as to make an easy fit with the bore of the tubular casing to insure the valve block being free to slide up and down without jamming or capsizing; the meeting faces of the valve, block and valve seat respectively made true so that they prevent the ingress to the bottle of any liquid sought to be poured or forced in; above the valve block in the tube another block of similar or equivalent construction likewise free to work up and down the tube; but prevented from coming out at the top thereof by a contraction therein or a fixed guard-plate stopper or other means fixed, cemented or securely joined with or to the neck or tube but with a passage or passages for final egress of the liquid; the valve block and guarding block having recessed or other passages for the egress of liquid and ingress of air as the liquid pours out and to increase the difficulty of tampering with the bottle and otherwise to improve the invention it is desirable to have a guard-plate between the valve block and the guard-block which plate is free to move up and down the liner in conjunction with the valve block and guard block and is either made of sufficient depth to prevent it coming materially out of alinement or by reason of the compactibility of the parts which is possible in my invention is retained in alinement by the two blocks and the liner such compactibility is an advantage in insuring the satisfactory movement of the sliding parts and in enabling the whole apparatus to be contained in a very small space and in increasing the difficulty of tampering with the contents of the bottle.

In the movable guard plate the passage or passages required are preferably through the plate instead of recessed or other passages at the side and likewise in the fixed guard plate and in neither case should the passage or passages coincide with or be a continuation of the passage or passages in the part or parts next to the guard plate in question, free passage way for the liquid being secured by means of projections or the shaping of the parts where contact would be made i. e. by the formation on the block or blocks contiguous to such guard plate for on the guard plates themselves of excrescences or shapings to prevent any blocking by the parts being forced against or adhering to each other.

Throughout this description I include in the expression "made true" all methods for making the surfaces referred to true and liquid tight when in contact such as by polishing, grinding, abrasion, careful manufacture or other known means of attainment of plane and positively close contact.

In the drawings—Figure 1 is an elevation partly in section of the bottle neck with my improved invention applied thereto; Fig. 2 shows separately by elevation and section the various details; Figs. 3, 4, 5, 6 and 7 show by plan views various designs for the shape at 8 of the movable part and valve; Fig. 8 shows by a view partly in section an arrangement of parts only differing from Fig. 1 in the construction of the liner; Fig. 9 is a sectional view of the liner illustrated in the arrangement last referred to; Figs. 10 and 11, respectively, are a sectional elevation and plan view of the sliding washer 9; and Figs. 12 and 13 are similar views to the preceding figures of the valve seat e.

In the accompanying drawings a portion of a bottle neck in section is shown as $a$, the part 2 being the portion of the bore destined for the cork or the like.

$b$, is the tube or liner, here shown as being attained by the junction of two pieces of glass $b$ and $b^2$ but it may be attained by molding it in one piece as shown by Figs. 4 and 5, $c$ is the sliding movable part, 9 is the sliding intermediate annular washer and $d$ is the valve, and $e$ the seat therefor of annular form fitted and cemented at 1 into the bottom end of the bore of the liner $b$, 2 is an opening for outpour of liquid from the bottle. The valve $d$ is formed with a true plane surface at 3 and so also is the corresponding surface of the valve seat at 4, and these meeting surfaces form the sealing against ingress of liquid to the bottle.

The part $c$ may be formed as a twin construction as indicated in Fig. 4 where the second piece as $c^2$ is shown and if so desired a second annulus 9 could be interposed.

I am aware that glass tubular liners with restricted openings, stop pieces, following blocks and valves with ground seats have been specified in various relations and combinations and I do not make any claim to their use *per se*.

Having now particularly described and ascertained the nature of my said invention and in what manner the same is to be performed, I declare that what I claim is:—

1. In a non-refillable bottle, a hollow tube secured within the neck of the bottle, a ring forming a valve seat fixed in one end of said tube, a valve member having an irregular face and also a substantially plain face slidable in the tube, a movable member having opposite irregular faced ends coöperative with the valve member, and a washer interposed between the valve and the movable member.

2. In a non-refillable bottle, a hollow tube having a ring at one end and a shoulder at the opposite end, a valve element having a flat face and an irregular face slidable in said tube, a movable member operative upon said valve element and having opposite irregularly shaped ends to afford a fluid passageway.

3. In a non-refillable bottle, a hollow tube having a ring at one end and a shoulder at the opposite end, a valve element having a flat face and an irregular face slidable in said tube, and a movable member operative upon said valve element and having opposite irregularly shaped ends to afford a fluid passage-way, and a washer intermediate the movable member and the valve element.

4. In a non-refillable bottle, a hollow shell arranged within the neck of the same, a ring forming a valve seat fixed in one end of said shell, a valve having an irregular face slidable in the shell, and irregularly shaped elements also slidable within the shell and operative upon the valve.

5. In a non-refillable bottle, a hollow tube carried within the neck of the bottle and having a ring at one end to form a valve seat, a shoulder at the opposite end of said tube, a plurality of movable elements having irregularly shaped faces arranged within the tube between the said shoulder and valve seat, one of said elements having a substantially plain face adapted to disengage and engage with the valve seat for opening and closing the neck of the bottle when moved in different positions, and a washer element interposed between two of the irregularly faced elements.

6. In combination with a bottle neck, a hollow tube mounted within the same and having a valve seat, irregularly shaped elements movable within the tube, one of said elements adapted to engage with the valve seat to close the passage-way through the bottle neck, and means interposed between two of the movable elements to hold the same spaced from each other and adapted to slide within the tube.

7. In combination with a bottle, means in the bottle to prevent ingress of fluid comprising a plurality of freely movable elements, a portion of the elements having irregular faces adapted to contact with another element, and means in the bottle to limit the movement of the said elements.

8. In combination with a bottle, means in the bottle including a plurality of movable elements, a portion of the elements having irregular surfaces to play upon another element to afford a fluid passage-way for pouring out a fluid in the bottle.

9. In combination with a bottle, means in the bottle including a plurality of movable elements, a portion of the elements having irregular surfaces to play upon another element to afford a fluid passage-way for pouring out a fluid in the bottle, and means within the bottle to form stops for limiting the movement of the elements in various directions.

10. In a bottle, a hollow tube secured within the neck of the same, a ring forming a valve seat fixed in the bottom of said tube, a valve member having a flat surface for making true contact with the valve seat and also provided with an irregular reverse face to make an easy fit within the bore of the hollow tube without jamming therein and also to form passages for the egress of liquid and ingress of air in the bottle, a movable member having opposite irregularly faced ends mounted in the tube, a washer having a central hole interposed between the valve member and movable member, said movable member and washer having a close fit in the tube to permit free movement in the latter, and a shoulder formed at the upper end of the tube to produce an exit opening.

11. In a bottle, a ring forming a valve seat fixed at one extremity of the bottle neck, a valve member having a flat face making true contact with the valve seat and also provided with an irregular reverse face to afford an easy fit with the bottle neck without jamming therein, said irregular face adapted to form passages for the egress of liquid and ingress of air, a movable member having opposite irregularly faced ends coöperative with the valve member, a washer with a central aperture or opening interposed between the valve member and the movable member, said washer adapted to form a close fit in the neck of the bottle to allow its free movement up and down in said neck, and a ring at the opposite extremity of the bottle neck forming an exit hole and adapted to limit the movement of said members.

In testimony whereof I have hereunto set my hand in presence of two subscribing witnesses.

HAROLD WILLIAM EDWIN JOSLING.

Witnesses:
ARTHUR SYDNEY GUSH,
WILLIAM HENRY CHIMSON.